United States Patent
Pauliac et al.

(10) Patent No.: US 11,177,951 B2
(45) Date of Patent: Nov. 16, 2021

(54) METHOD FOR PROVISIONING A FIRST COMMUNICATION DEVICE BY USING A SECOND COMMUNICATION DEVICE

(71) Applicant: GEMALTO SA, Meudon (FR)

(72) Inventors: Mireille Pauliac, Meudon (FR); Michel Endruschat, Meudon (FR); Ly Thanh Phan, Meudon (FR); Jean-Yves Fine, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 386 days.

(21) Appl. No.: 16/320,291

(22) PCT Filed: Mar. 30, 2017

(86) PCT No.: PCT/EP2017/057517
§ 371 (c)(1),
(2) Date: Jan. 24, 2019

(87) PCT Pub. No.: WO2018/028843
PCT Pub. Date: Feb. 15, 2018

(65) Prior Publication Data
US 2019/0238324 A1    Aug. 1, 2019

(30) Foreign Application Priority Data
Aug. 11, 2016   (EP) .................................. 16306046

(51) Int. Cl.
*H04L 29/06* (2006.01)
*H04L 9/08* (2006.01)
*H04L 9/30* (2006.01)

(52) U.S. Cl.
CPC .............. *H04L 9/088* (2013.01); *H04L 9/083* (2013.01); *H04L 9/0825* (2013.01);
(Continued)

(58) Field of Classification Search
CPC ......... H04L 9/088; H04L 9/30; H04L 9/0825; H04L 67/1046; G16Y 30/10
See application file for complete search history.

(56) References Cited

U.S. PATENT DOCUMENTS 9,220,012 B1    12/2015   Dattatray
2003/0179884 A1   9/2003   Guterman
(Continued)

FOREIGN PATENT DOCUMENTS

EP    2890073 A1    7/2015

OTHER PUBLICATIONS

PCT/EP2017/057517, International Search Report, dated Jun. 23, 2017, European Patent Office, P.B. 5818 Patentlaan 2 NL-2280 HV Rijswijk.

(Continued)

*Primary Examiner* — Thaddeus J Plecha
(74) *Attorney, Agent, or Firm* — The Jansson Firm; Pehr B. Jansson

(57) ABSTRACT

This invention related to a method for provisioning a first communication device with a set of at least one credential required for accessing to a wireless network by using a second communication device provisioned with a cryptographic key K also known by the wireless network, the first communication device being associated with a certificate comprising a public key PK, said certificate being stored with an associated private key PrK in said first communication device, the method comprising the following steps: receiving by the second communication device a registration request from the first communication device in order to be provisioned with the set of at least one credential; transmitting to the wireless network by the second communication device the registration request to generate a set of at least one credential associated to the first communication device
(Continued)

comprising at least a cryptographic key K", the wireless network being adapted to generate a first random number R1 and a second random number R2; receiving by the second communication device a response from the wireless network comprising R1 and R2; generating K' by the second communication device using R1 and K; transmitting by the second communication device to the first communication device K' and R2 to generate K" using R2 and K'.

21 Claims, 1 Drawing Sheet

(52) U.S. Cl.
CPC .......... *H04L 9/0827* (2013.01); *H04L 9/0869* (2013.01); *H04L 9/30* (2013.01); *H04L 2209/805* (2013.01)

(56) References Cited

U.S. PATENT DOCUMENTS

| | | | | |
|---|---|---|---|---|
| 2005/0210279 A1* | 9/2005 | Lee | ........................ | H04L 9/3273 713/194 |
| 2010/0287375 A1* | 11/2010 | Lee | ........................ | G06Q 20/341 713/171 |
| 2010/0290351 A1* | 11/2010 | Toepke | .............. | G05B 19/4185 370/250 |
| 2016/0036793 A1* | 2/2016 | Su | .......................... | H04L 9/0836 713/171 |
| 2016/0242032 A1* | 8/2016 | De Kievit | ............... | H04L 9/088 |

OTHER PUBLICATIONS

PCT/EP2017/057517, Written Opinion of the International Searching Authority, dated Jun. 23, 2017, European Patent Office, D-80298 Munich.

* cited by examiner

METHOD FOR PROVISIONING A FIRST COMMUNICATION DEVICE BY USING A SECOND COMMUNICATION DEVICE

TECHNICAL FIELD

The present invention relates to a method for provisioning a first communication device with a set of at least one credential required for accessing to a wireless network by using a second communication device, and is applicable to the field of the Internet of Things.

BACKGROUND OF THE INVENTION

The 3GPP telecom industry is working on the definition of the Next Generation System corresponding to fifth generation (5G) wireless network. One of the key market drivers for 5G is massive deployment of Internet of Things (IoT) devices. As defined in recommendation ITU-T Y.2060, Internet of Things refers to a global infrastructure for the information society, enabling advanced services by interconnecting physical and virtual things based on existing and evolving interoperable information and communication technologies. Further, the expression IoT device refers to a piece of equipment with communication capabilities and optionally capacity of data capture, sensing, data storage, sensing and/or data processing.

Industry trends today is for the IoT device to have the ability to initially connect to the 5G network without prior subscription stored in the device, that is to say with no bootstrap subscription or any other subscription pre-provisioned in the IoT device. This is explained by the fact that the device manufacturers want to minimize stickiness with telecom operators.

In this description, a subscription refers to an agreement to receive or be given access to electronic services such as exchanging data over a telecommunication network. The subscription is materialized by the attribution of one or several credentials to a subscriber and/or to a device associated to this subscriber.

An IoT device is said activated when it comprises a set of at least one credential usable to set up a data connection with a wireless network. On the contrary, an IoT device is referred as non-activated when it does not comprises a set of at least one credential usable to set up a data connection with a wireless network.

Manual provisioning is a solution that can be considered for an IoT device that has not been yet activated. However, this option is not user friendly, time consuming, and the security level may not be the highest. Indeed, the credentials required for the activation need to be communicated to the user of the IoT device or employee in charge of provisioning the IoT devices in manufacturing premises, who will then be able to carry out the manual provisioning, for example by inserting a physical element containing the subscription such as an UICC within the IoT device.

A technology to securely and remotely provision an IoT device with a set of at least one credential is therefore needed.

SUMMARY OF THE INVENTION

The invention relates to a method for provisioning a first communication device with a set of at least one credential required for accessing to a wireless network by using a second communication device provisioned with a cryptographic key K also known by the wireless network, the first communication device being associated with a certificate comprising a public key PK, said certificate being stored with an associated private key PrK in said first communication device, the method comprising the following steps:
receiving by the second communication device a registration request from the first communication device in order to be provisioned with the set of at least one credential;
transmitting to the wireless network by the second communication device the registration request to generate a set of at least one credential associated to the first communication device comprising at least a cryptographic key K", the wireless network being adapted to generate a first random number R1 and a second random number R2, a cryptographic key K' being derived from R1 and K, the cryptographic key K" being derived from R2 and K';
receiving by the second communication device a response from the wireless network comprising R1 and R2, R2 being ciphered using the public key PK of the certificate associated to the first communication device;
generating K' by the second communication device using R1 and K;
transmitting by the second communication device to the first communication device K' and the ciphered version of R2 for the first communication device to decipher R2 using its private key PrK and to generate K" using R2 and K'.

According to an example, K' is generated using a derivation function F' memorized by the second communication device.

According to an example, K" is generated using a derivation function F" memorized by the first communication device.

According to an example, F' is an HMAC-SHA-256 function.

According to an example, F" is an HMAC-SHA-256 function.

In one embodiment, the registration request is signed using key PrK.

The registration request is for example transmitted with a SessionID generated by the first communication device and certificate comprising public key PK.

According to one aspect of the invention, the method comprises a step for establishing a local communication link between the first and the second communication devices.

The communication link is established using for example Bluetooth Low Energy technology.

According to one aspect of the invention, the method can also comprise a step of verifying the state of the first communication device, the registration request being send if this state shows that the first communication device is activated.

In one embodiment, a subscription identifier IMSI' is transmitted to the first communication device by the second communication device, the subscription identifier being provided by the wireless network together with R2, the subscription identifier being also ciphered using the public key PK.

The invention also relates to a second communication device configured to establish a data connection with a first communication device and to implement the method according to any of the preceding claims.

The invention also relates to a first communication device configured to be provisioned with a set of at least one credential required for accessing to a wireless network by using a second communication device provisioned with a cryptographic key K also known by the wireless network, the first communication device being associated with a certificate comprising a public key PK, said certificate being stored with an associated private key PrK in said first communication device, the first communication device being further configured to:

send to the second communication device a registration request in order to be provisioned with the set of at least one credential, said registration request being then transmitted to the wireless network by the second communication device for it to generate a set of at least one credential associated to the first communication device, said set of at least one credential comprising at least a cryptographic key K", the wireless network being adapted to generate a first random number R1 and a second random number R2, a cryptographic key K' being derived from R1 and K, the cryptographic key K" being then derived from R2 and K';

receive from the second communication device a version of R2 ciphered by the wireless network using the public key PK of the certificate associated to the first communication device and K' that has been locally generated by said second communication device using R1 received from the wireless network and key K;

decipher R2 using private key PrK;

generate K" using R2 and K'.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
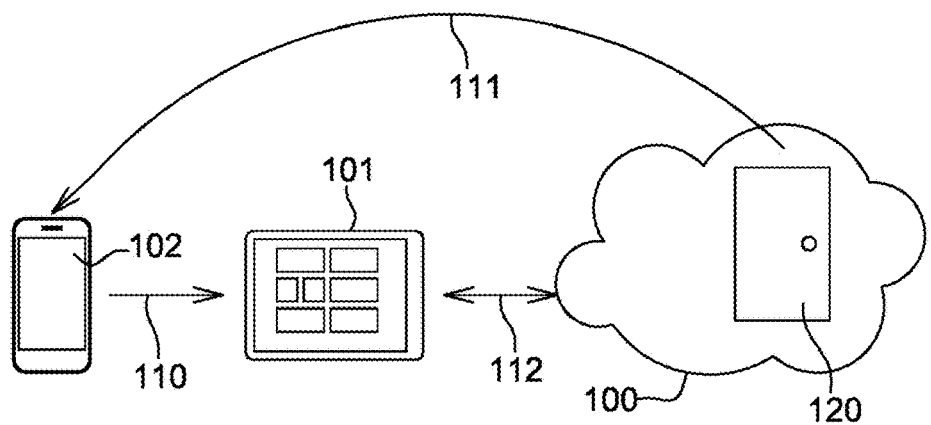
FIG. 1 is a representation of a telecommunication system implementing a technology for activating a wireless device.

FIG. 1 is a representation of a telecommunication system implementing a technology for activating a wireless device.

In this example, the system comprises a first communication device 101 which can be an IoT device that needs to be activated. The system also comprises a second communication device 102, for example a smartphone.

The second communication device is already provisioned with credentials, including a cryptographic key K, allowing it to establish a data connection with a wireless network 100. The skilled person will easily understand that the second communication device can also be provisioned with other needed data such as a subscriber identifier of IMSI (International Mobile Subscriber Identifier) type. The wireless network comprises a computing unit 120, for example a server, adapted to generate credentials. According to the invention, the credentials are not transmitted to the first communication device 101. Instead, a set of parameters is transmitted 111 by the network 100 to the second communication device 102 for it to calculate an intermediate key K' derived from the key K known by the second communication device 102 and the wireless network 100. Then, this intermediate key K' is transmitted 110 with one or several of the aforementioned parameters to the first communication device 101 for it to derive a second key K". This second key is a credential that can then be used by the first communication device 101 to establish a direct connection 112 with the wireless network 100, that is to say with at least one computing unit 120 of the wireless network 100. The set of at least one credential comprise key K" but can also comprise additional data, for example an identifier of the subscriber allocated by the network operator.

In this description, the invention is mainly described in the context of a first communication device benefiting of a local wireless connection established with a second communication device to set up an initial access to a wireless network for provisioning purposes. However, the local connection between the first 101 and the second 102 device can be of wired type. For example, a USB cable can be used for that purpose.

Figure 2:
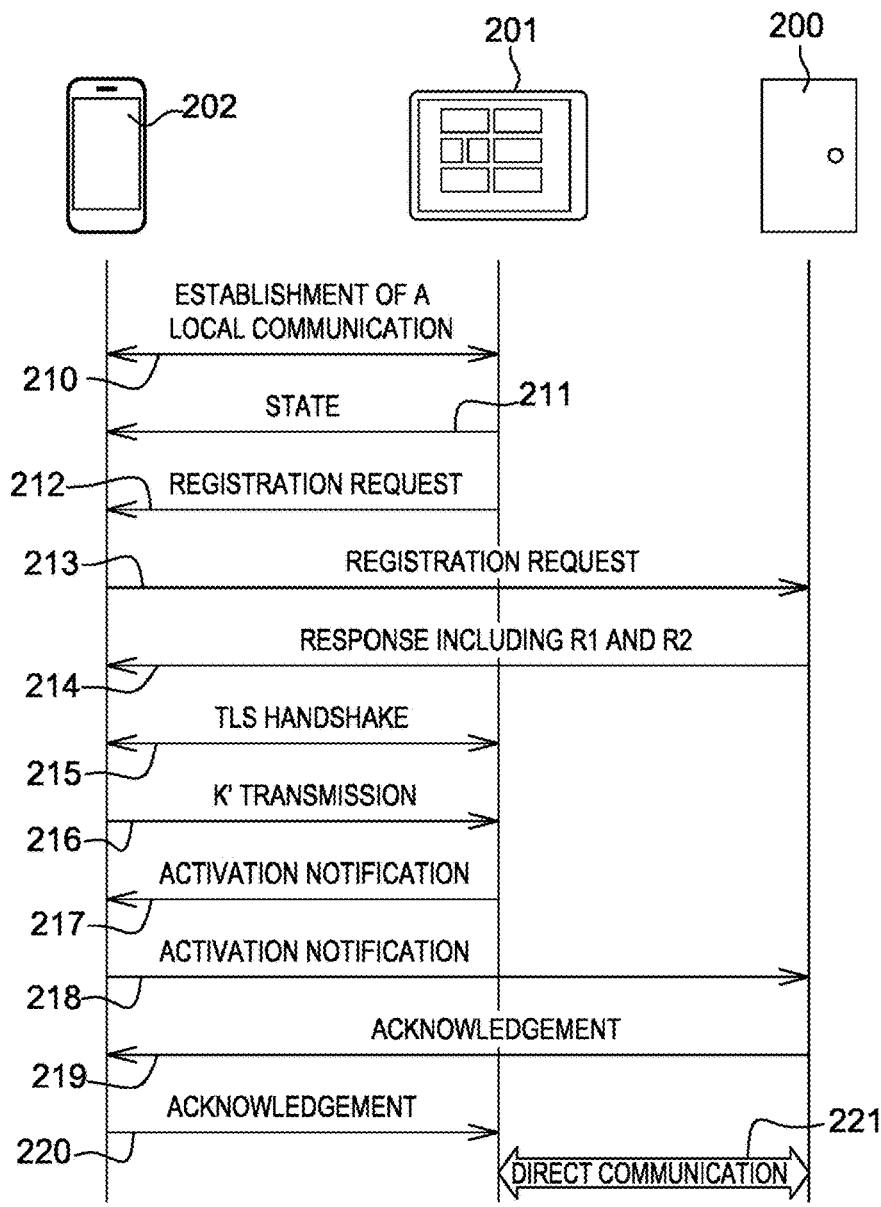
FIG. 2 is a sequence diagram illustrating an example of message exchanges for provisioning a wireless device with a set of at least one credential.

FIG. 2 is a sequence diagram illustrating an example of message exchanges for provisioning a wireless device with a set of at least one credential and associated subscriber identity.

According to this example, a first communication device 201 needs to be activated in order to access to a wireless network. For that purpose, it uses a connection established with a second communication device 202. The second communication device 202 is adapted to establish a connection with a server 200 of a wireless network.

This activation of a subscription can be performed by implementing the steps described below.

Initially, a manual pairing between the first 201 and the second 202 wireless devices can be implemented. Then, a local connection 210 between the first 201 and second communication devices 202 can be established. As an example, this local connection is wireless and a technology such as Bluetooth Low Energy (BLE) can be implemented. This technology is particularly efficient for power saving. A pairing code can be configured by the user on its second wireless 202 device and then used by the second communication device 202 for establishing the local connection with the first communication device 201. The skilled person will understand that alternatives technologies such as WiFi can also be considered for establishing this radio link, depending on the capabilities of the two devices. Wired connection can also be considered, for example using a USB cable (Universal Serial Bus).

Then, the second communication device 202 acquires 211 from the first device 201 an information indicating if it is activated or non-activated. This can be done by requesting the first communication device 201 to read and transmit the value of an internal parameter STATE stored in its memory. This parameter can be configured in two states, for example STATE=ACTIVATED or STATE=DEACTIVATED. STATE parameter can be of Boolean data type.

If the first communication device 201 is not activated, it requests 212 for registration. As an example, the registration request is transmitted with a random session identifier SessionID and a certificate of the first communication device 201.

The certificate is stored in the first communication device 201 by its manufacturer. In a preferred embodiment, this certificate comprises a public key PK. The associated private key PrK is kept secret and memorized in the first communication device 201.

The session identifier SessionID is for example a sequence number managed by the first communication device 201. In a particular embodiment, this sequence number is incremented at the time of establishing a new communication session with the network. Such a communication session can be established through the second communication device 102 or directly with the wireless network 100. The first SessionID generated may be randomly produced by the first communication device 101, 201.

In one embodiment, the registration request message 212 can be advantageously signed using key PrK.

The second communication device 202 knows the address of the server 200 of the wireless network that is in charge of activating wireless devices by creating subscriptions and generating the associated credentials. It is therefore able to route 213 the request message to a targeted server 200 in the wireless network.

The server 200 then verifies if the certificate is valid. It also verifies the session identifier and the signature of the registration request. For example, the server 200 verifies that the received SessionID is greater than what it has already received or has not been used if any.

The server 200 is also responsible of generating two random numbers R1 and R2 which can be of integer type, for example. These are used to derive two session keys referred respectively as K' and K".

As an example, K' is derived from K and R1 by applying a key derivation function F'. K" is derived from K' and R2 by applying a key derivation function F":

$$K'=F'(K,R1)$$

$$K''=F''(K',R2)$$

F' and F" are for example two HMAC-SHA-256 functions.

A subscriber identifier IMSI' can also be generated for the first communication device if needed. According to a preferred embodiment, this identifier is an International Mobile Subscriber Identifier (IMSI). In that case, the value of the subscriber identifier is also generated or chosen among available IMSIs by the wireless network server and associated with K".

Once the set of at least one credential associated to the new registration is available, the server 200 sends a response 214 to the registration request 213. In this example, this response comprises the random numbers R1, R2 and optionally the session identifier SessionID and the subscription identifier IMSI', and can be noted:

$$\text{Response}(R1,\text{Ciph\_}PK[\text{SessionID},\text{IMSI'},R2])$$

The notation Ciph_PK[SessionID, IMSI', R2] is employed to show that SessionID, IMSI' and R2 are transmitted enciphered using the public key PK of the certificate received by the server 200. This allows the sending of the three parameters SessionID, IMSI' and R2 to the first communication device 201 through the second communication device 202 while keeping them safe from being read in clear by said second communication device 202.

To enforce security of the local data connection established between the first communication device 201 and the second communication device 202, a cryptographic protocol such as Transport Layer Security (TLS) can be used. In that case, a TLS handshake 215, that is to say a message exchange between the two wireless devices 201, 202 is carried out to set up this secure channel. This message exchange is not detailed here as the skilled person is able to find those information related to these cryptographic protocols belonging to the state-of-the-art.

After receiving the response 214, the second communication device 202 is capable of determining key K' from R1 and K. For that purpose, it uses the derivation function F' as follow:

$$K'=F'(K,R1)$$

Then, K' as well as the ciphered data R2 and optionally SessionID, IMSI' are routed 216 to the second communication device 202.

Once the routed data 216 is received by the first communication device 201, it is then able to decipher SessionID, IMSI' and R2 using its private key PrK.

The first communication device 201 is then capable of determining K" using the already mentioned expression:

$$K''=F''(K',R2)$$

The functions F' and F" are respectively known and memorized by the second 202 and first 201 communication devices.

At this stage, the first communication device 201 is provisioned with the credentials K" and IMSI' associated to the new subscription and can therefore be considered as activated. According to an embodiment, an activation notification 217, 218 is sent to the network server 200 via the second communication device 200.

According to an embodiment, a record of subscription comprising credentials IMSI and K used by the second communication device 201 to permit the activation of the first communication device is memorized by the wireless network.

Then the network sends an acknowledgment 219, 220 to the first communication device 201 via the second communication device 202 in order to indicate that the credentials associated to the new subscription can now be used for the first communication device 201 to be authenticated and to communicate directly 221 on the wireless network 200. At this stage, the first communication device 201 is considered as activated.

The invention can be advantageously used when the activation of a communication device shall be directly controlled by an operator, for example on industrial premises. For example, a car subscription can be activated by a sales person just before delivering to a customer a new connected car.

This new technology for providing to a wireless device a set of at least one credential associated to a subscription induces numerous advantages. In particular, on the server side:
  there is no need for pre-provisioning of subscription server with subscriptions until the activation of the wireless devices is requested. This lower the overhead costs of IoT device deployment.
  the device certificate verification and the authorization of using the newly provided credentials is done by the server at the time of activation, so the first communication device 201 cannot connect to the network with invalid credentials as compared to a pure offline activation process.

Regarding the security aspects, one fundamental advantage is that the cryptographic keys K' and K" are not sent out of the wireless network. On the contrary, those kept by the network and the first and second communication devices 201, 202 are able to calculate them locally between the server and the primary device.

Additionally, the second communication device 202 does not know the IMSI' nor the secret key K" attributed to the first communication device 201. This guaranties the anonymity of the first communication device 201.

Another advantage is that there is no need to issue a physical Universal Integrated Circuit Card (UICC) provisioned with the needed credentials for it to be inserted into the secondary device.

Further, there is no need for a bootstrap subscription pre-configured in the wireless device to activate if an embedded UICC (eUICC) is used, resulting in lower overhead costs.

The invention claimed is:

1. A method for provisioning a first communication device with a set of at least one credential required for accessing a wireless network by using a second communication device provisioned with a cryptographic key K also known by the wireless network, the first communication device being associated with a certificate comprising a public key PK, said certificate being stored with an associated private key PrK in said first communication device, the method comprising the following steps:
receiving by the second communication device a registration request from the first communication device in order to be provisioned with the set of at least one credential;
transmitting to the wireless network by the second communication device the registration request to generate a set of at least one credential associated to the first communication device comprising at least a cryptographic key K", the wireless network being adapted to generate a first random number R1 and a second random number R2, a cryptographic key K' being derived from R1 and K, the cryptographic key K" being derived from R2 and K';
receiving by the second communication device a response from the wireless network comprising R1 and R2, R2 being ciphered using the public key PK of the certificate associated to the first communication device;
generating K' by the second communication device using R1 and K;
transmitting by the second communication device to the first communication device K' and the ciphered version of R2 for the first communication device to decipher R2 using the private key PrK of the first communication device and to generate K" using R2 and K'.

2. The method according to claim 1, wherein K' is generated using a derivation function F' memorized by the second communication device.

3. The method according to claim 1, wherein K" is generated using a derivation function F'" memorized by the first communication device.

4. The method according to claim 2, wherein F' is an HMAC-SHA-256 function.

5. The method according to claim 3, wherein F'" is an HMAC-SHA-256 function.

6. The method according to claim 1, wherein the registration request is signed using key PrK.

7. The method according to claim 1, wherein the registration request is transmitted with a SessionID generated by the first communication device and certificate comprising public key PK.

8. The method according to claim 1 comprising a step for establishing a local communication link between the first and the second communication devices.

9. The method according to claim 8, wherein the communication link is established using Bluetooth Low Energy technology.

10. The method according to claim 1 comprising a step of verifying a state of the first communication device, the registration request being sent if the state shows that the first communication device is activated.

11. The method according to claim 1, wherein a subscription identifier IMSI' is transmitted to the first communication device by the second communication device, the subscription identifier being provided by the wireless network together with R2, the subscription identifier being also ciphered using the public key PK.

12. A second communication device comprising a processor, a memory, and a communication interface, the second communication device configured to establish a data connection with a first communication device over the communication interface, the second communication device further configured to:
receive a registration request from the first communication device in order to be provisioned with a set of at least one credential, including a cryptographic key K;
transmit to a wireless network the registration request to generate a set of at least one credential associated to the first communication device comprising at least a cryptographic key K", the wireless network being adapted to generate a first random number R1 and a second random number R2, a cryptographic key K' being derived from R1 and K, the cryptographic key K" being derived from R2 and K';
receive a response from the wireless network comprising R1 and R2, R2 being ciphered using a public key PK of a certificate associated to the first communication device;
generate K' using R1 and K; and
transmitting by the second communication device to the first communication device K' and the ciphered version of R2 for the first communication device to decipher R2 using a private key PrK of the first communication device and to generate K" using R2 and K'.

13. The second communication device of claim 12 further configured to generate K' using a derivation function F' memorized by the second communication device.

14. The second communication device of claim 13 wherein F' is an HMAC-SHA-256 function.

15. The second communication device of claim 12 wherein the registration request is signed using key PrK.

16. The second communication device of claim 12 wherein the registration request is transmitted with a SessionID generated by the first communication device and certificate comprising public key PK.

17. The second communication device of claim 12 further configured to establish a local communication link between the first and the second communication devices.

18. The second communication device of claim 17 wherein the second communication device establishes the communication link using Bluetooth Low Energy technology.

19. The second communication device of claim 12 further configured to verify a state of the first communication device, the registration request being sent if this state shows that the first communication device is activated.

20. The second communication device of claim 12 further configured to transmit a subscription identifier IMSI' to the first communication device, the subscription identifier being provided by the wireless network together with R2, the subscription identifier being also ciphered using the public key PK.

21. A first communication device comprising a processor, a memory, and a communication interface, the first communication device configured to be provisioned with a set of at least one credential required for accessing a wireless network by using a second communication device provisioned with a cryptographic key K also known by the wireless network, the first communication device being associated with a certificate comprising a public key PK, said certificate being stored with an associated private key PrK in said first communication device, the first communication device being further configured to:

send to the second communication device a registration request over the communication interface in order to be provisioned with the set of at least one credential, said registration request being then transmitted to the wireless network by the second communication device for the wireless network to generate a set of at least one credential associated to the first communication device, said set of at least one credential associated to the first communication device comprising at least a cryptographic key K", the wireless network being adapted to generate a first random number R1 and a second random number R2, a cryptographic key K' being derived from R1 and K, the cryptographic key K" being then derived from R2 and K';

receive from the second communication device a version of R2 ciphered by the wireless network-using the public key PK of the certificate associated to the first communication device and K' that has been locally generated by said second communication device using R1 received from the wireless network and key K;

decipher R2 using private key PrK;

generate K" using R2 and K'.

\* \* \* \* \*